United States Patent [19]
Ballard

[11] 3,785,433
[45] Jan. 15, 1974

[54] AIR CONDITIONING SYSTEM INCLUDING INDOOR FAN SPEED CONTROL

[75] Inventor: James L. Ballard, Ellicott City, Md.
[73] Assignee: General Electric Company
[22] Filed: May 30, 1972
[21] Appl. No.: 257,702

[52] U.S. Cl. .................................. 165/27, 165/40
[51] Int. Cl. ........................................... F25b 29/00
[58] Field of Search ..................... 165/39, 40, 27, 28

[56] References Cited
UNITED STATES PATENTS
3,367,408 2/1968 Moreland .............................. 165/27
3,454,078 7/1969 Elwart .................................. 165/27

Primary Examiner—Charles Sukalo
Attorney—Walter E. Rule et al.

[57] ABSTRACT

An air conditioning system comprising both heating and cooling means and a motor-driven air circulating means includes control means responsive to the temperature of the air flowing from the cooling means for increasing the motor speed during operation of the cooling means.

4 Claims, 2 Drawing Figures

PATENTED JAN 15 1974  3,785,433

AIR CONDITIONING SYSTEM INCLUDING INDOOR FAN SPEED CONTROL

BACKGROUND OF THE INVENTION

Modern air conditioning systems including both heating and cooling means are preferably operated with a lower indoor fan speed for lower air flow during heating operation and a higher fan speed during cooling. To accomplish the different fan speeds, the usual practices are either to mechanically select the desired indoor motor fan speed for heating and cooling seasonal operation or to provide an additional relay control for the indoor fan which will accomplish the changeover automatically when the thermostat system is in heating or cooling position. The first of these practices is inconvenient and time consuming while the second is costly since an additional relay is required in the control circuit for effecting the fan speed changeover.

SUMMARY OF THE INVENTION

In accordance with the present invention, there is provided an air conditioning system comprising an air cooling means, an air heating means, and an air circulating means including a multiple-speed drive motor for circulating a stream of air to be conditioned in heat transfer relationship with the cooling and heating means. The circuitry for controlling the operation of the air conditioning system includes switch means for selectively operating either the heating or the cooling means and a motor energizing circuit for energizing the drive motor during operation of either the heating or cooling means. The motor energizing circuit includes a temperature responsive switch means responsive to the temperature of the airstream flowing from the cooling means for operating the drive motor at a higher speed only when the temperature of the air sensed thereby indicates operation of the cooling means.

DESCRIPTION OF THE PREFERRED EMBODIMENT

Figure 1:
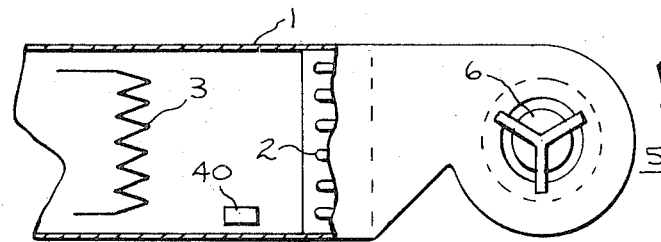
FIG. 1 is a somewhat schematic illustration of a portion of an air conditioning system incorporating the present invention.
Figure 2:
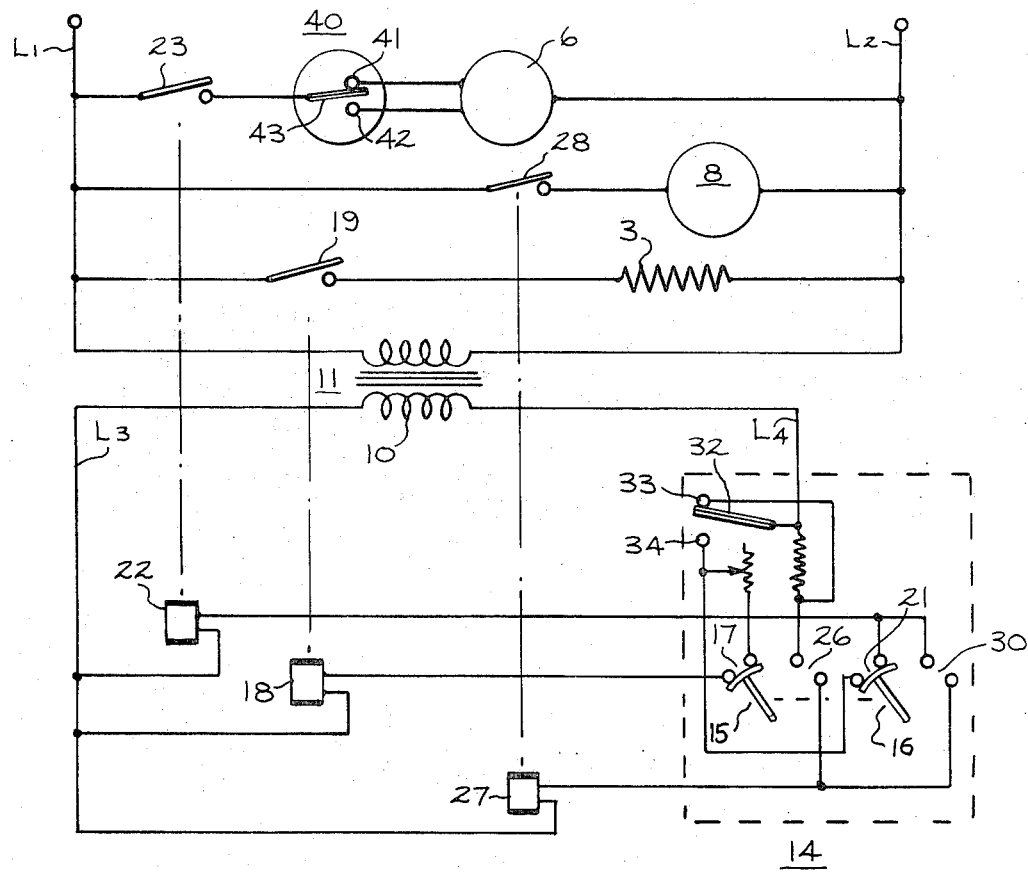
FIG. 2 is a schematic circuit diagram of the controls employed in the practice of the present invention.

With reference to FIG. 1 of the drawing, there is schematically illustrated a portion of an air conditioning system comprising a chamber or duct 1 containing air cooling means 2 in the form of an evaporator component of a refrigeration system and air heating means 3 which in the illustrated embodiment of the invention comprises an electrical resistance heater. A fan or blower 5 driven by a multiple-speed motor 6 provides air circulating means for circulating air to be conditioned over the cooling means 2 and the heating means 3, the conditioned air being returned to the enclosure through suitable duct work (not shown). With reference to FIG. 2, the heater 3, the indoor fan motor 6 and the compressor component 8 of the refrigeration system are connected in parallel across supply lines L1, L2. The low voltage control circuit for controlling the energization of the heater 3, fan motor 6 and compressor 8 comprises the secondary 10 of a transformer 11 and leads L3 and L4.

The low voltage control circuit includes a heating-cooling thermostat generally indicated by the numeral 14. The thermostat 14 includes manually-operable selector switch means 15 and 16 movable together to a first position in which the heating contacts 17 of switch 15 control the energization of the electric heater 3 through the relay 18 operating a switch 19, while fan-heating contacts 21 of switch 16 control the energization of the relay 22 operating switch 23 in the fan circuit. In their second positions, switch 15 bridges cooling contacts 26 controlling the energization of the relay coil 27 operating switch 28 controlling the energization of compressor 8, while fan-cooling contacts 30 of switch 16 are bridged to energize relay 22 for operating the fan motor 6.

The thermostat 14 also includes bimetal switch means 32 having a cooling contact 33 and a heating contact 34 and is responsive to the enclosure temperature conditions for maintaining the desired temperatures within the enclosure. Bimetal switch cooling contact 33 is in series connection across lines L3, L4 with cooling contact 17 and relay 27 and is also in series connection with fan-cooling contacts 30 and fan relay 22. Bimetal heating contact 34 is in series connection with heating contacts 17 and heater relay 18 and also in series connection with fan-heating contacts 21 and fan relay 22.

The circuitry thus far described provides for energization of the fan motor 6 whenever the heater 3 or the refrigerant compressor 8 is energized, the fan 6 being energized in both cases by relay 22 closing the fan relay switch 23.

In accordance with the present invention, means are provided for automatically increasing the fan speed when the air conditioning system is operating on the cooling cycle. To this end, there is provided a thermostat switch 40 mounted within the duct 1 in the path of the airstream flowing through the duct downstream from the evaporator 2. Preferably, the switch 40 is mounted between the cooling means 2 and the heating means 3. As shown in FIG. 2 of the drawing, this thermostat switch 40 is connected in the fan circuit in series with the fan switch 23, and the fan motor 6 includes a low speed contact 41 and a higher fan speed contact 42. During the heating operation, or under any condition in which the air cooling means 2 is not operating, the bimetal switch arm 43 engages the low speed contact 41 to operate the fan motor 6 at low speed. Thus, the fan 6 operates at low speed during the heating operation and also during the initial portion of a cooling cycle operation, that is, when the compressor 8 is first turned on. Switch 40 is so designed that when it senses the flow of cooled air from the cooling evaporator, the switch is actuated to complete a motor energizing circuit through contact 42 for operating the fan motor at a high speed. Thus, the speed of the fan motor 6 is controlled solely by the temperature sensed by the thermostat 40 and is completely independent of any setting of the switches forming part of the thermostat 14. In other words, unlike the known control systems, the speed of the indoor fan motor 6 is not controlled by the positioning of switches such as the switches 15 and 16 forming part of the thermostat 14 but is rather independently controlled by the temperature of the circulating air downstream from the cooling means 2.

Thus, the speed of the fan motor 6 is increased only when the air conditioning system is actually operating on the cooling cycle. For example, when the enclosure thermostat 14 calls for heating, the fan motor starts at low speed and remains on low speed. When the enclosure thermostat calls for cooling, the fan motor starts on low speed since the evaporator forming the cooling means 2 has not started to cool the airstream passing therethrough but as the temperature falls under the cooling action of the air cooling means 2, the thermostat 40 senses the lower air temperature and switches the fan motor 6 to a higher speed. As this action of the thermostat switch 40 is automatic, no seasonal manual changeover of the fan speed is required and there is no necessity for an additional high fan speed relay such as the relay 22 for effecting operation of the fan at high speed on the cooling operation.

While the invention has been described with reference to a specific embodiment thereof, it will be understood that it is not limited thereto and it is intended by the appended claims to cover all such modifications as fall within the true spirit and scope of the invention.

I claim:

1. In an air conditioning system comprising air cooling means, air heating means, and air circulating means including a multiple-speed drive motor for circulating a stream of air in heat transfer relationship with said cooling and heating means; control means including:
switch means for selectively operating said heating or cooling means; and
a motor energizing circuit including a drive motor switch for energizing said drive motor during operation of either said heat means or said cooling means;
said motor energizing circuit including temperature responsive switch means in series with said drive motor switch and in the path of the airstream flowing from said cooling means for operating said motor at a higher speed only when the temperature of the air sensed thereby indicates operation of said cooling means.

2. An air conditioning system according to claim 1 in which said temperature responsive switch means is between said cooling and heating means.

3. In an air conditioning system comprising air cooling means, air heating means, and air circulating means including a multiple-speed drive motor for circulating a stream of enclosure air to be conditioned in heat transfer relationship first with said cooling means and thereafter with heating means; control means including:
a thermostat including switch means for selectively operating said heating or cooling means and for controlling the operation of said heating and cooling means in response to enclosure temperature;
a motor energizing circuit including a drive motor switch for energizing said drive motor during operation of either said heat means or said cooling means; and
said motor energizing circuit including temperature responsive switch means in series with said drive motor switch and in the path of the airstream flowing from said cooling means for initially operating said motor at a low speed and for increasing the motor speed only when the temperature of the air sensed thereby indicates operation of said cooling means.

4. An air conditioning system according to claim 3 wherein said temperature responsive switch means is positioned between said cooling and heating means.

* * * * *